United States Patent [19]

Franklin

[11] Patent Number: 5,602,343
[45] Date of Patent: Feb. 11, 1997

[54] METHOD OF, AND APPARATUS FOR, MEASURING THE VELOCITY OF A FLUID

[75] Inventor: Dean Franklin, Columbia, Mo.

[73] Assignee: The Curators of the University of Missouri, Columbia, Mo.

[21] Appl. No.: 541,549

[22] Filed: Oct. 10, 1995

[51] Int. Cl.$^6$ ............................................. G01F 1/00
[52] U.S. Cl. ............................. 73/861.29; 73/861.18
[58] Field of Search ....................... 73/861.18, 861.28, 73/861.29, 861.31, 118.11

[56] References Cited

U.S. PATENT DOCUMENTS

| | | | |
|---|---|---|---|
| 3,440,876 | 4/1969 | Hayes et al. | 73/861.29 |
| 3,473,378 | 10/1969 | Yoshiyama et al. | 73/861.29 |
| 3,575,049 | 4/1971 | Boland | 73/861.29 |
| 3,641,817 | 2/1972 | Dary | 73/861.29 |

*Primary Examiner*—Richard Chilcot
*Assistant Examiner*—Ronald Biegel
*Attorney, Agent, or Firm*—Armstrong. Teasdale, Schlafly & Davis

[57] ABSTRACT

An apparatus for measuring the velocity of fluid flowing in a fluid path, includes a signal generator for generating input signals, and two ultrasonic transducers coupled diagonally across the fluid path. The transducers are connected in series to the signal generator such that equal and opposite input signals are simultaneously applied to each transducer. A signal processor combines the output signals of each transducer caused by the ultrasonic signal transmitted by the other transducer across the fluid path to obtain a destructive interference signal and a constructive interference signal, and compares the amplitude of the destructive interference signal with the amplitude of the constructive interference signal to obtain a measure of the velocity of the fluid. The signal processor may also compare the phase of the destructive interference signal with the phase of the constructive interference signal to obtain a measure of the direction of flow. The method measuring the velocity of a fluid according to this method comprises simultaneously applying equal but opposite input signals to two ultrasonic transducers coupled diagonally across the fluid path to cause them to generate ultrasonic signals. The output signals of each transducer caused by the ultrasonic signal transmitted by the other transducer across the fluid path are combined to obtain a destructive interference signal. The amplitude of the destructive interference signal is compared with the amplitude of the constructive interference signal to obtain a measure of the velocity of the fluid.

6 Claims, 2 Drawing Sheets

METHOD OF, AND APPARATUS FOR, MEASURING THE VELOCITY OF A FLUID

BACKGROUND AND SUMMARY OF THE INVENTION

This invention relates to a method of, and apparatus for, measuring the velocity of a fluid.

A common technique for measuring the velocity of a fluid flowing in a fluid path is to provide two ultrasonic transducers on opposite sides of the fluid path, one of the transducers being upstream relative to the other, and measuring the fluid velocity according to the difference in transit time of an ultrasonic signal in the upstream and downstream directions. This technique is capable of providing an accurate measure of the velocity of a fluid, and a relatively large number of systems have been designed to implement this technique, including those disclosed in U.S. Pat. Nos. 2,991,640, 3,097,526, 3,402,606, 3,440,876, 3,473,378, 3,631,719, 3,678,731, 3,906,791, 3,918,304, 3,935,735, 4,052,896, 4,312,239, 4,334,434, 4,367,654, 4,446,744, 4,475,406, 4,483,202, 4,545,244, 4,860,593 and 5,325,726

However, many of these prior art fluid velocity measuring systems employed elaborate signal processing to measure and compare transit times. Others of these systems had to be calibrated for a specific fluid, under specific conditions, and thus could not reliably measure fluid under changing conditions.

The present invention relates to an improved method of, and apparatus for, measuring the velocity of fluid flowing in a fluid path. Generally the method of the present invention comprises the steps of simultaneously applying equal but opposite input signals to two ultrasonic transducers acoustically coupled diagonally across the fluid path to cause the transducers to generate ultrasonic signals and combining the output signal of each transducer, caused by the ultrasonic signal transmitted by the other transducer across the fluid path, to obtain a destructive interference signal and a constructive interference. Then the amplitude of the destructive interference signal is compared with the amplitude of the transducer output signal (i.e., the output signal of either of the transducers) to obtain a measure of the velocity of the fluid.

Generally, the apparatus for measuring fluid velocity according to the present invention comprises a signal generator for generating input signals, and two ultrasonic transducers acoustically coupled diagonally across the fluid path, and connected in series to the signal generator such that equal and opposite input signals are simultaneously applied to the transducers. The apparatus also includes a signal processor for combining the output signals of each transducer caused by the ultrasonic signal transmitted by the other transducer across the fluid path to obtain a destructive interference signal and a constructive interference signal. The signal processor also compares the amplitude of the destructive interference signal with the amplitude of the transducer output signal to obtain a measure of the velocity of the fluid.

By simultaneously providing the transducers with equal but opposite input signals, and combining the output signals to obtain destructive and constructive interference signals, the method and apparatus of the present invention greatly simplify the processing of signals, and the determination of the fluid velocity. The method and apparatus of the present invention allow the received signals to be demodulated without reference to the phase of the excitation signal used to create the input signals. Furthermore, with the method and apparatus of the present invention there is no need for calibration against an independent reference signal. The difference in transit time can be calculated directly from the amplitude and frequency of the output signals from the transducers.

The method of, and apparatus of, this invention is particularly adapted for measuring fluid flow, such as blood through a conduit or vessel.

These and other features and advantages will be in part apparent, and in part pointed out, hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

Figure 1:
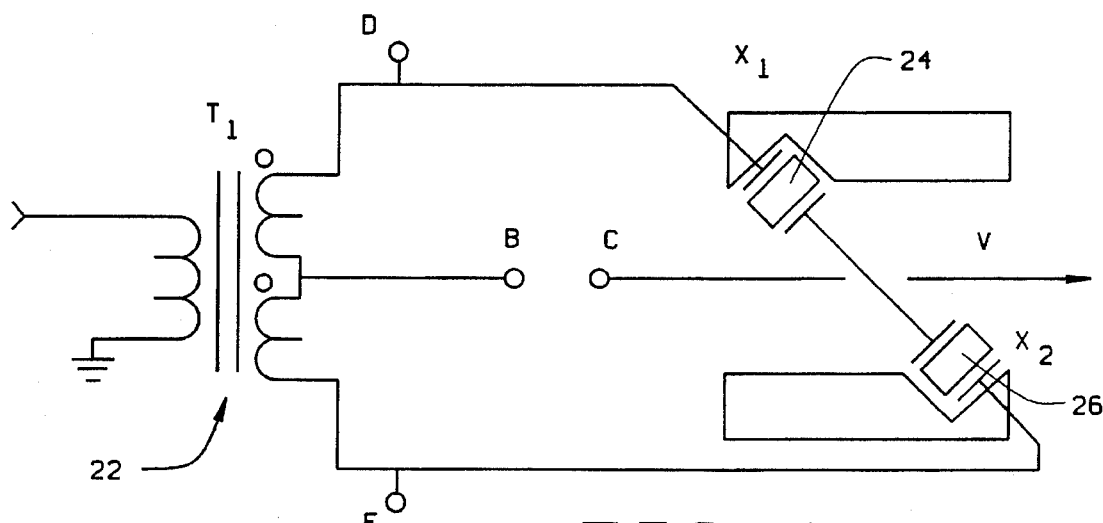
FIG. 1 is a schematic diagram of an apparatus for measuring the velocity of fluid in a fluid path according to the principles of this invention, for implementing the method of this invention.

FIG. 1 is a schematic diagram of an apparatus for measuring the velocity of fluid in a fluid path according to the principles of this invention, for implementing the method of this invention. As shown in FIG. 1, the apparatus comprises a signal generator 22 for generating input signals, and two ultrasonic transducers 24 and 26 coupled diagonally across the fluid path P, and connected in series to the signal generator such that equal and opposite input signals are simultaneously applied to each transducer. As shown in FIG. 1, the transducers are preferably located on opposite sides of the fluid path, one upstream of the other, but it is possible that the transducers are positioned on two same sides of the fluid path, and coupled diagonally across the fluid path by a reflector intermedial the transducer. It is also possible two pairs of transducers be used instead of two transducers. One transducer in a pair functions as a transmitter and one as a receiver.

The electric input signal to each transducer, causes the transducers to generate ultrasonic wave trains that are acoustically coupled diagonally through the intervening fluid flow. The ultrasonic wave trains move from the generating transducer through the fluid and arrive at the other transducer at a later time, dependent upon the separation of the transducers, the velocity of sound in the fluid, and the velocity of the fluid. If the fluid between the transducers is stationery, both ultrasonic wave trains arrive at the receiving transducers simultaneously, and the resultant electrical signals developed by the transducers will be equal and opposite, and thus there is no signal between points B and C (the destructive interference signal). There will be a signal between points D and E (the constructive interference signal).

If the fluid between the transducers is moving in the direction indicated by the arrow at a velocity v, the upstream ultrasonic wave train (the wave train received by transducer 24) will take longer to traverse the distance d between the transducers than the downstream ultrasonic wave train (the wave train received by transducer 26) because of the movement of the fluid through which the ultrasonic wave trains travel, and this difference is in proportion to the average velocity of the fluid. This difference in transit time means that the electrical signals developed by the transducers will not precisely cancel, i.e., there will be a signal between points B and C (a destructive interference signal). In fact the signal will be wave train whose amplitude is proportional to the fluid velocity, and whose phase indicates the direction of velocity. The difference signal measured between B and C (the destructive interference signal) is given by the formula:

$$A\sin(\omega t + \Phi) - A\sin(\omega t - \Phi) = 2A\cos\omega t \sin\Phi$$

where A is the amplitude of the signal across each transducer, and $\Phi$ is the flow-induced phase shift. Because of this relationship, $\Phi$ can be calculated from the simple measurements of A (the amplitude of the received signals) and the amplitude of the signal from B to C, according to the formula:

$$\Phi = \arcsin((B \text{ to } C)/2A)$$

for between $-\pi/2$ and $+\pi/2$. With a knowledge of $\omega$, the difference in ultrasonic transit time can be calculated from these simple measurements without reference to an external or artificial time reference.

A synchronous reference signal is desirable for demodulation of the destructive interference signal between B and C. In a conventional system of the prior art, the master oscillator signal used to excite the transducers would typically be used for demodulation of the received signal. However, the phase received signal relative to the master oscillator signal varies with the separation of the transducers and the velocity of sound in the fluid, and thus using the master oscillator signal as a reference makes the system extremely sensitive to variations in the velocity of sound in the fluid and the separation of the transducers. Thus with prior art systems that relied upon the master oscillator for demodulation, the system had to be calibrated for specific conditions, and changes in these conditions, such as would be caused by temperature changes, would affect the accuracy of the velocity measurement.

With the apparatus of the present invention, and according to the method of the present invention, the received signals from the transducers contain the required coherent phase reference information. The signal measured between points D and B equal the signal measured from points B to E in phase and amplitude if the fluid is stationary. With flow, the amplitude of each signal remains constant and the phase of one is advanced while the phase of the other is retarded by an equal amount. The resultant signal measured from D to E is unshifted in phase. The signal measured from D to E (the constructive interference signal) is given by the formula:

$$A\sin(\omega t + \Phi) + A\sin(\omega t - \Phi) = 2A\sin\omega t \cos\Phi$$

The relationship of the phase between the signal between B and C (the destructive interference signal) and the signal between D and E (the constructive interference signal) is fixed at 90°. The signal between D and E can be coupled back through the primary transformer where it is available as a fixed phase reference signal for phase sensitive demodulation of the signal between B and C (the destructive interference signal).

It would be possible to manually or automatically switch the position of transducers at the bridge to allow the bridge to be balanced during flow conditions, if desired.

Figure 2:
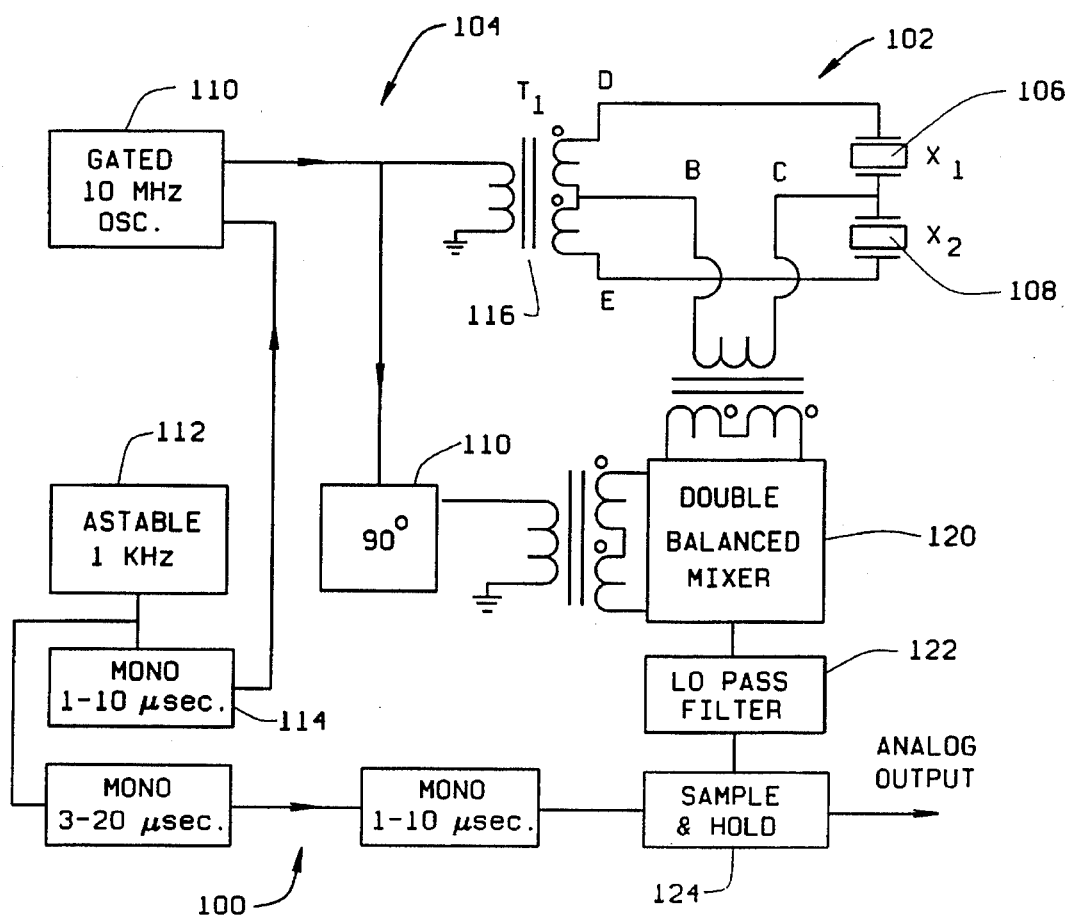
FIG. 2 is a block diagram of a practical apparatus for measuring the velocity of fluid in a fluid path according to the principles of this invention.

A block diagram of a practical apparatus 100 for measuring the velocity of fluid in a fluid path according to the principles of this invention is shown in FIG. 2. The apparatus 100 comprises a transducer bridge 102, having a signal generator 104 for generating input signals, and two ultrasonic transducers 106 and 108 coupled diagonally across the fluid path P, and connected in series to the signal generator such that equal and opposite input signals are simultaneously applied to each transducer. The signal generator 102 includes a gated 10 MHz oscillator 110. An astable multivibrator 112 triggers a monostable multivibrator 114 at a 1 KHz repetition rate. The resulting 10 μsec rectangular signal gates the oscillator 110 to produce a 10 MHz wave train to the primary winding of transformer 116. The secondary windings of the transformer 116 are connected to the transducers 106 and 108 to drive the transducers in series and 180° out of phase with reference to the common connection between the two crystals. The sum of the two received signals measured between D and E (the constructive interference signal) is coupled back through the transformer 116, and shifted 90° by phase shifter 118, and applied to a passive (diode) double balanced mixer 120. The difference of the signals measured between B and C (the destructive interference signal) is connected to the RF port of the mixer 120.

The output of the mixer 120 is passed through a low pass filter 122 to remove the RF signal and retain the DC component. A range delay signal is generated and adjusted in duration to trigger a range gate during the time of arrival of the ultrasonic signals. The range gate signal triggers a sample and hold circuit 124 to produce an analog voltage proportional to the relative phase between the upstream and downstream received signals. This analog signal can be further processed or displayed to display a measure of the velocity of the fluid. The polarity of the signal indicates the direction of flow.

Figure 3:
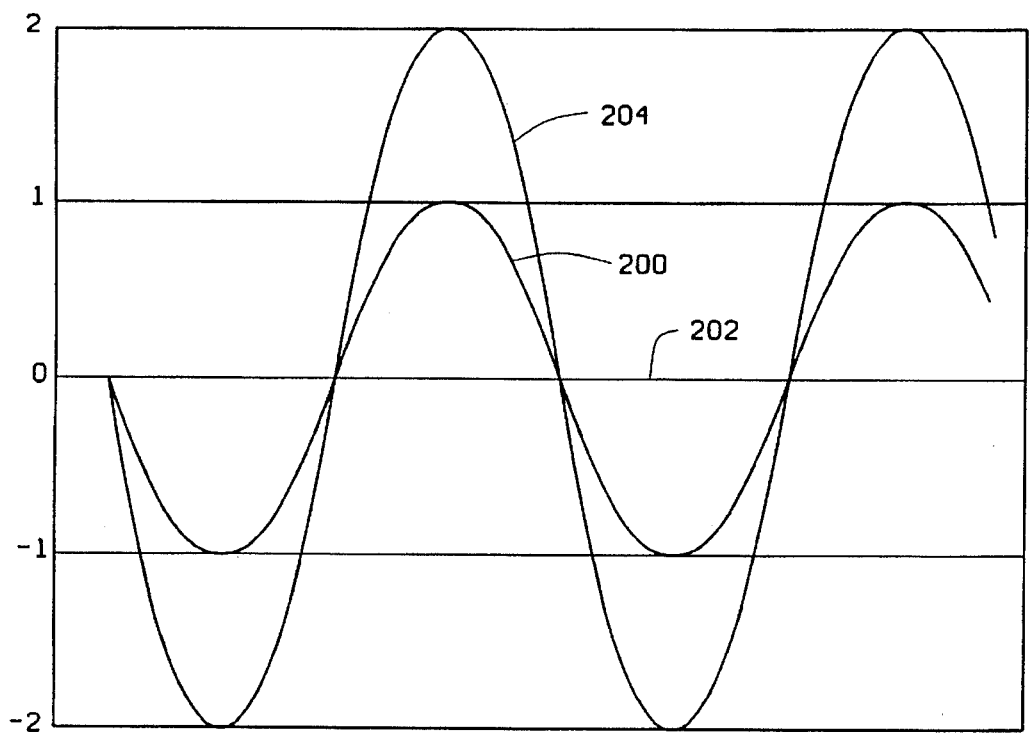
FIG. 3 is a graph of the transducer output signals, and the destructive and constructive interference signals of the transducer output signals, under a no flow condition.
Figure 4:
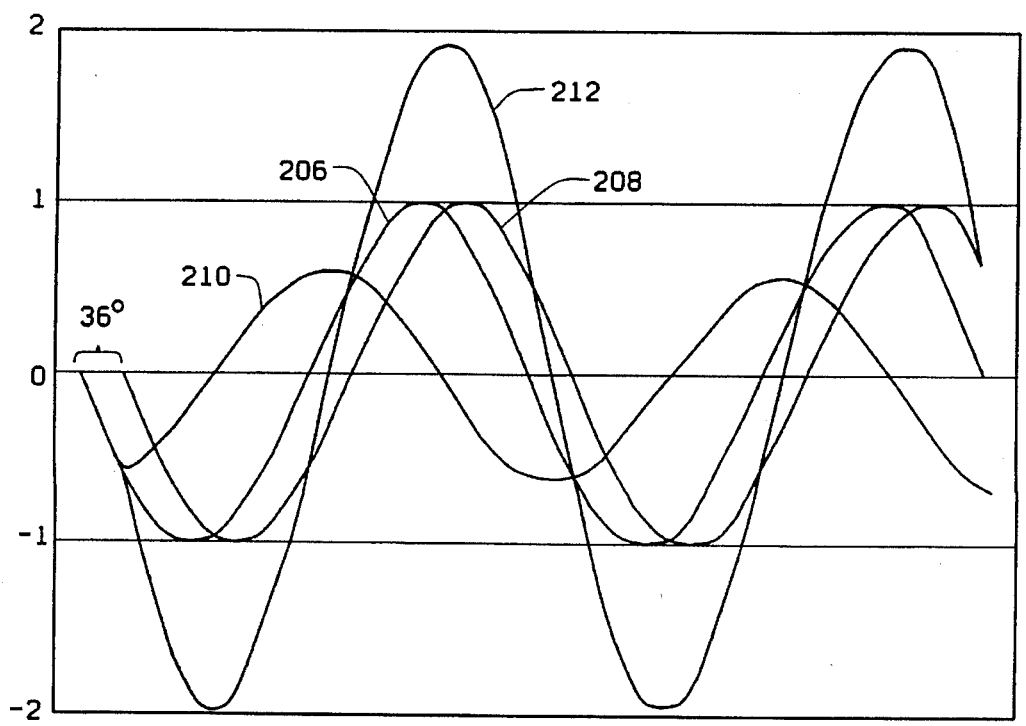
FIG. 4 is a graph of the transducer output signals, and the destructive and constructive interference signals of the transducer output signals, under a flow conditions.

The method of the present invention is illustrated with reference to FIGS. 3 and 4, which show the signals at the various points in the schematic diagram in FIG. 1. As shown in FIG. 3, under a no flow condition, the received signals from the transducers E to C and C to D are indicated by line 200. Because of the way these signals are connected in a bridge, the signals precisely cancel when there is no flow, and thus the signal measured between B and C (the destructive interference signal) is zero, as indicated by line 202. The signal measured between D and E (the constructive interference signal) is indicated by line 204. As shown in FIG. 4, when there is a flow, the received signal transducers is similar but out of phase. Because of the difference in transit time caused by of the flow of the fluid, there is a difference in phase between the signals form each of the transducers. Thus the phase of the signal from the downstream transducer 26 (the signal E to D and indicated as line 206) is advanced relative to the signal from the upstream transducer 24 (the signal C to D and indicated as line 208). Because of the way these signals are connected in a bridge, the signals do not precisely cancel when there is a flow, and thus the signal measured between B and C (the destructive interference signal) is indicated by line 210. The signal measured between D and E (the constructive interference signal) is indicated by line 212. FIG. 4 illustrates that there is a 90° phase difference between the destructive and constructive interference signals.

As shown in FIG. 4, the flow of the fluid induces an approximately 18° phase shift in each of the signals from the transducers, for a total phase difference of approximately 36°.

EXAMPLE

A system constructed in accordance with FIG. 1 was tested with a water flow to produce a 10+2 nanoseconds transit time differential. When a 6 volt pp wave train was applied to the transformer, the received signal across each transducer was 0.3 volts pp. The signal measured between B and C (the destructive interference signal) was measured at 0.18 volts pp. From these measurements, Φ, the flow induced phase shift can be calculated as follows:

Φ=arcsin((*B* to *C*)/2*A*)

Φ=arcsin(0.18/(2) (0.3))

Φ=−17.6°

The total upstream-downstream phase difference is 2Φ or −35.2°, which at 10 MHz is equivalent to a transit time difference of 9.6 nanoseconds. The fluid velocity can be calculated from the transit time difference and the speed of sound in the medium, $S_m$. The speed of sound in the medium, $S_m$, can be easily measured by measuring the transit time of an ultrasonic pulse between the transducers, the speed of sound being so much greater than the velocity of the fluid flowing that dividing the distance d between the transducers by the transit time is an accurate measure of the speed of sound in the fluid.

The velocity of the fluid can be calculated as follows:

$v = S_m^2 \Delta t/(2) (d) (\cos \alpha)$

Where Δt is the transit time as determined with the apparatus of, and according to method of, the present invention; d is the distance between the transducers; and α is the angle between the direction of fluid flow and the ultrasonic path between the transducers.

Thus, the apparatus for, and method of, measuring fluid velocity of the present invention provides a simple and accurate way to measure differential transit time, and thereby calculate the velocity of fluid flowing in a path.

I claim:

1. An apparatus for measuring the velocity of fluid flowing in a fluid path, comprising:

a signal generator for generating input signals;

two ultrasonic transducers coupled diagonally across the fluid path, and connected in series to the signal generator such that equal and opposite input signals are simultaneously applied to each transducer;

a signal processor for combining the output signals of each transducer caused by the ultrasonic signal transmitted by the other transducer across the fluid path to obtain a destructive interference signal and a constructive interference signal and comparing the amplitude of the destructive interference signal with the amplitude of the transducer output signal to obtain a measure of the velocity of the fluid.

2. The apparatus according to claim 1 wherein the signal processor also compares the phase of the destructive interference signal with the phase of the constructive interference signal to obtain a measure of the direction of flow.

3. The apparatus according to claim 1 wherein the signal processor shifts the phase of the constructive interference signal 90° before comparing the phase of the destructive interference signal with the constructive interference signal to obtain a measure of the direction of flow.

4. A method of measuring the velocity of fluid flowing in a fluid path, comprising the steps of:

simultaneously applying equal but opposite input signals to two ultrasonic transducers coupled diagonally across the fluid path to cause them to generate ultrasonic signals;

combining the output signal of each transducer caused by the ultrasonic signal transmitted by the other transducer across the fluid path to obtain a destructive interference signal;

combining the output signal of each transducer caused by the ultrasonic signal transmitted by the other transducer across the fluid path to obtain a constructive interference signal; and comparing the amplitude of the destructive interference signal with the amplitude of the transducer output signal to obtain a measure of the velocity of the fluid.

5. The method according to claim 4 further comprising the step of comparing the phase of the destructive interference signal with phase of the constructive interference signal to obtain a measure of the direction of flow.

6. The method according to claim 5 wherein the step of comparing the phase of the destructive interference signal with the phase of the constructive interference signal comprises shifting the phase of the constructive interference signal 90° before comparing the phases.

* * * * *